A. WICKERSHAM.
AIR WASHER.
APPLICATION FILED AUG. 29, 1912.
1,094,107. Patented Apr. 21, 1914.
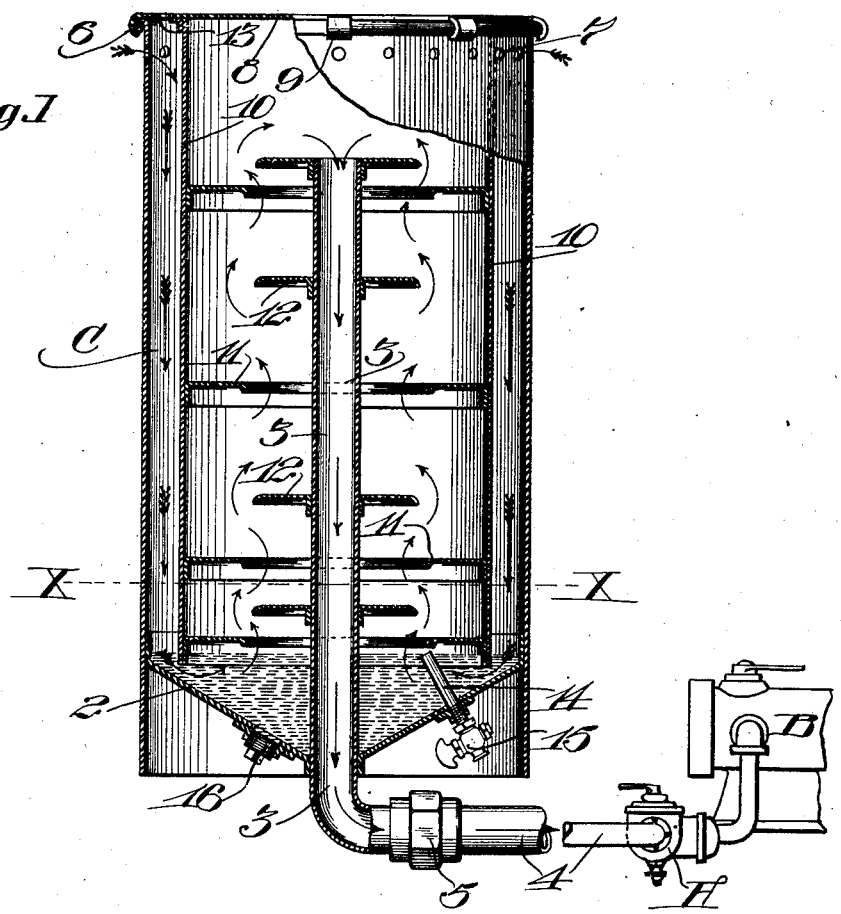
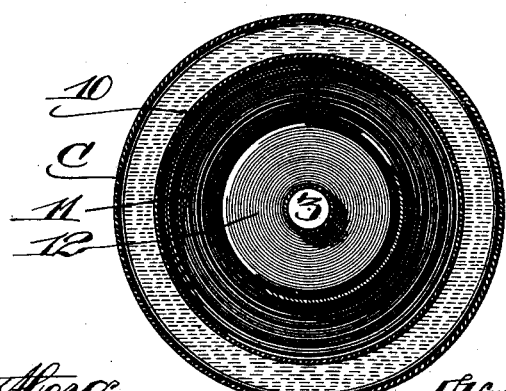
WITNESSES:
INVENTOR
Alfred Wickersham
BY G. H. Strong.
ATTORNEY

UNITED STATES PATENT OFFICE.

ALFRED WICKERSHAM, OF SUNNYVALE, CALIFORNIA, ASSIGNOR TO ATMOSPHERIC CLARIFIER CO., A CORPORATION.

AIR-WASHER.

1,094,107.  Specification of Letters Patent.  Patented Apr. 21, 1914.

Application filed August 29, 1912. Serial No. 717,718.

*To all whom it may concern:*

Be it known that I, ALFRED WICKERSHAM, a citizen of the United States, residing at Sunnyvale, in the county of Santa Clara and State of California, have invented new and useful Improvements in Air-Washers, of which the following is a specification.

This invention relates to means for increasing the efficiency of gas engines and the like, and particularly pertains to the combination of a filtering device with an engine and carbureter.

It is the object of this invention to provide a device which is especially applicable for use in connection with carbureters, air compressors and other mechanisms utilizing air, whereby all foreign bodies, such as grit, dust and the like, are effectively removed from the air before entering the mechanism handling it.

Another object is to provide an air-wash or filter which is simple in construction, economical in manufacture and which can be readily attached to and detached from the air intake pipes of any apparatus using air.

The principal advantage to be derived from the use of this invention is the saving of wear on sliding parts in gas engines, air compressors and the like, due to fine particles of dirt, grit and other foreign substances being drawn into the cylinders and deposited in the joints between the sliding parts; as the device constituting the present invention absolutely prevents foreign bodies from entering the cylinders with the air.

Other objects and advantages will appear hereinafter.

The invention primarily resides in a receptacle of suitable construction containing a liquid trap or seal, means for admitting air to one side of the trap and drawing it from the receptacle on the opposite side of the trap by suction; a series of deflectors in the receptacle preventing the passage of heavy particles not taken up by the liquid, and means for insuring a certain level of the liquid in the receptacle.

The invention further consists of the parts and the construction and combination of parts as hereinafter more fully described and claimed, having reference to the accompanying drawings, in which—

Figure 1 is a view in vertical section of the device partly in elevation. Fig. 2 is a horizontal section on the line X—X of Fig. 1.

In Fig. 1 I have diagrammatically represented a carbureter A and gas engine B, with which the filter is used in combination.

In the drawings C represents a vertically disposed cylindrical casing open at the top and formed with a downwardly convergent bottom 2, which bottom is here shown as formed by securing a conical shaped member on the interior of the casing C; the casing C and bottom 2 forming a receptacle for a liquid of any suitable description.

Extending upwardly through the bottom 2 at its center is a tube or pipe 3, the upper end of which terminates a short distance below the upper edge of the casing C and the lower end of which opens beneath the bottom 2 and is adapted to be connected to the suction or intake pipe 4 leading to the carbureter. The lower end of the pipe 3 is here shown as threaded to receive one member of an ordinary union joint 5, another member of which is threaded on the suction pipe 4, in the usual manner, the union 5 facilitating the attaching and detaching of the device to and from the suction pipe 4.

The upper end of the cylindrical casing C is beaded over to form a rim or flange 6 immediately below which a series of perforations 7 are formed, through which air is admitted into the casing, as will be later described. The upper end of the casing is closed by means of a top or cover 8, consisting of a flat plate on the outer edge of which is formed downwardly extending spring clips 9 adapted to engage the bead 6 on the upper end of the casing to retain the cover in position thereon, and at the same time permit of its ready removal.

Formed on the underside of the cover 8 is a downwardly extending cylinder 10, the lower end of which is open to the interior of the casing at a point a short distance above the bottom 2; the outer face of the cylinder 10 being concentric with the inner face of the casing and spaced therefrom to form an air passage therebetween.

A series of inwardly extending annular deflectors or baffle plates 11 are formed on the inner face of the cylinder 10, which baffles project to a point approximately midway between the inner face of the cylinder and the outer face of the pipe 3, and are spaced any suitable distance apart. Mounted on the pipe 3 are baffles 12, corresponding in number to the baffles 11, and staggered in relation thereto. The baffles 11 entirely surround the pipe 3 and terminate a short distance inside the inner circumferential edges of the baffles 11 to admit of the latter passing over the baffles 12 in placing the cover 8 and the cylinder 10 thereon in position, in the casing C. The outer edges of the baffles 11 and 12 are turned downwardly to form flanges which serve to prevent such particles of dirt, grit, and the like, as may be carried against the underside of the baffles with the upward current of air passing therearound, from being drawn outward and upward over the edges of the baffles, as will be later described.

The casing is designed to contain a suitable liquid, such as water, oil, or the like, in sufficient quantity to submerge the lower end of the cylinder 10 a short distance, as indicated in Fig. 1. This liquid may be introduced into the interior of casing in any suitable manner, either by pouring it into the upper end of the casing when the cover 8 is removed; or by pouring it through an opening 13 in the cover 8, when the latter is placed on top of the casing and secured thereto by means of the clips 9. Means are provided for insuring that the top of the liquid in the casing will lie upon a certain level. This means is here shown as consisting of an overflow pipe 14 mounted in the bottom 2 in the casing, and extending upwardly therefrom with its upper end terminating on the desired level of the liquid. The lower end of the pipe 14 passes through the bottom 2 and is fitted with a cut-off valve 15, which valve is normally closed and is opened only when it is desired to drain such liquid as may be above the upper end of the pipe 14 in the casing C.

The bottom 2 is provided with a plug 16, or its equivalent, which is removed when it is desired to drain the chamber for cleaning purposes.

In the application and operation of the invention the pipe 3 is connected to the suction or intake pipe 4 by means of the union 5, or in any other suitable manner, and the liquid is introduced into the casing to such depth as to submerge the lower end of the cylinder 10, and form a liquid seal therefor; the cut-off valve 15 being opened to drain surplus liquid and bring its top to a level with the upper end of the pipe 14. The liquid thus forms a trap between the interior of the cylinder 10 and the space surrounding it, and necessitates all air entering the cylinder from the casing passing therethrough. A suction being induced in the pipe 4 tends to create a vacuum in the pipe 3 and the cylinder 10, thereby drawing air from the space between the casing and the cylinder 10 through the liquid beneath the lower end of the cylinder 10. From the foregoing it will be seen that a continuous flow of air through the perforation 7 in the casing, down and under the lower end of the cylinder 10, through the liquid upward around the baffle plates 11 and 12 within the cylinder 10, and downward through the pipe 3, as indicated by the arrows in Fig. 1, will be induced by creating a suction in the pipe 4. The air in passing through the liquid is washed and cleansed of dust, dirt, grit and other fine particles which are collected in the liquid, and settle to the convergent or inclined bottom 2. Such particles as may not be collected by the liquid will be carried upward by the upwardly moving current of air in the cylinder 10, where they will be deflected by coming in contact with the staggered baffles 11 and 12, and will thereby be prevented from entering the pipe 3 and suction pipe 4. The air drawn into the suction pipe 4 will thus be washed and cleansed of all foreign substances; the body of liquid forming a screen for preventing fine particles from entering the chamber 10.

This invention is applied with especial success in connection with the operation of traction engines working in orchards, fields, and along public highways where there is a great deal of dust; the filter being interposed in the air pipe leading to the carbureter. This combination has proven particularly valuable and resulted in a greatly increased efficiency of the engine.

The alternately arranged baffles 11—12 with their downwardly projecting peripheral flanges, are an important feature of the invention, particularly in assisting in the drying of the air by obstructing its upward passage after going through the body of water in the bottom of the receptacle. These baffles or deflectors are so disposed that they continually interrupt the direct flow of the air and prevents the water jetting, or being carried through the air into the carbureter, which would be detrimental to the operation of the engine. The downwardly turned flanges serve to direct the water back into the bottom of the tank.

Having thus described my invention, what I claim and desire to secure by Letters Patent, is—

1. In an air filter the combination of a casing having air inlets adjacent its upper end and a convergent bottom, a cover for said casing, a cylinder on the underside of said cover, with its lower end terminating a short distance above the bottom of the casing and opening to the interior of the latter, means for introducing a liquid into the casing to submerge the open lower end of the cylinder and form a seal therefor, means for draining the liquid from the casing to a level above the lower end of the cylinder, and means connecting with a suction apparatus to admit of air in the cylinder being withdrawn therefrom adjacent its upper end.

2. In an air filter the combination of a casing having air inlets adjacent its upper end and a convergent bottom, a cover for said casing, a cylinder on the underside of said cover, with its lower end terminating a short distance above the bottom of the casing and opening to the interior of the latter, means for introducing a liquid into the casing to submerge the open lower end of the cylinder and form a seal therefor, means for draining the liquid from the casing to a level above the lower end of the cylinder, and means connecting with a suction apparatus to admit of air in the cylinder being withdrawn therefrom adjacent its upper end, including an upwardly extending pipe passing through the bottom of the casing with its upper end terminating adjacent the cover within the cylinder.

3. In an air purifier, the combination of a water containing receptacle, an inner cylinder open at the bottom and closed at the top within and spaced from the receptacle and submerged at its lower end in liquid within the receptacle, a series of annular baffles or deflectors within the inner cylinder, an air inlet into the annular space formed between the receptacle and inner cylinder and above the liquid level, an air outlet from the inner cylinder, said receptacle, cylinder, liquid and baffles so constructed and arranged that air drawn into the chamber formed between the receptacle and cylinder passes downwardly through the liquid and upwardly past the said annular deflectors, said deflectors having means for downwardly directing the moisture carried upward by the air currents.

4. In an air purifier, the combination of a receptacle adapted to contain water, an inner cylinder closed at the top and open at the bottom, with its lower end submerged in the liquid within the receptacle, said cylinder spaced from the side of the receptacle to provide an air passage downwardly and through the water and under the inner edge of the cylinder, a column providing an outlet for the air, extending up through the receptacle and cylinder and opening into the top of the cylinder, said column having spaced, annular baffles with downwardly turned edges arranged above the liquid level, and intermediate ring baffles on the cylinder with downwardly turned edges, said receptacle, cylinder, baffles and column so constructed and arranged that entering air in the space between the receptacle and cylinder is drawn downwardly through the body of liquid and below the lower edge of the cylinder, passes upwardly past the baffles and finally downwardly again through the column, the downwardly turned edges on said baffles checking the upward travel of moisture carried in suspension by the air.

In testimony whereof I have hereunto set my hand in the presence of two subscribing witnesses.

ALFRED WICKERSHAM.

Witnesses:
WILL M. BEGGS,
D. STAATS.